June 29, 1965     R. L. WIEGEL ETAL     3,191,386

HOVERING BAG BREAKWATER

Filed Jan. 19, 1962

INVENTORS
RICHARD A. FRIEND
BY ROBERT L. WIEGEL

ATTORNEY

/ Patented June 29, 1965

3,191,386
HOVERING BAG BREAKWATER
Robert L. Wiegel, Berkeley, and Richard A. Friend, Richmond, Calif., assignors to the United States of America as represented by the Secretary of Navy
Filed Jan. 19, 1962, Ser. No. 167,455
3 Claims. (Cl. 61—5)

This invention relates generally to breakwaters which may be used along the shores of natural bodies of water and specifically to portable breakwaters that may be moved with facility from one location to another.

Breakwaters in many forms have been used throughout the ages to protect selected areas near the coasts or shores of natural bodies of water against the forces of wind and wave impinging thereon. Such selected protected areas afford safe anchorage and passage for vessels of all description and provide adequate protection for structures located in the water or on the adjacent shores. Such breakwaters, erected in comparatively shallow waters, have been more or less permanent in character and are comparatively costly to construct and maintain.

In amphibious operations, military or civilian, a type of breakwater is needed that can be easily emplaced for the protection of the desired amphibious operation and then can be easily dismantled and moved to another location. Various types of such portable breakwaters have been proposed such as the employment of thin flexible plastic membranes on the water surface; the employment of chemical additives that increase the viscosity of the water by a considerable factor; and thin rigid vertical curtains which extend from some distance above the water surface down through the trough of the wave. During the studies of these types of breakwaters, various disadvantages were found which militated against their adoption and use.

The principal object of this invention, therefore, is to provide a portable breakwater which is highly efficient in reducing the amplitude of incident waves with the purpose of providing a protected area between such breakwaters and the shore which area is conducive to amphibious operations including passage of vessels and erection of structures thereon or thereby.

Another object of this invention is to provide a portable breakwater which is relatively inexpensive and which can easily be installed and then, when desired, moved to another location with equal facility.

Other objects and many of the attendant advantages of this invention will be readily appreciated as the same becomes better understood by reference to the following detailed description when considered in connection with the accompanying drawings wherein.

Figure 1:
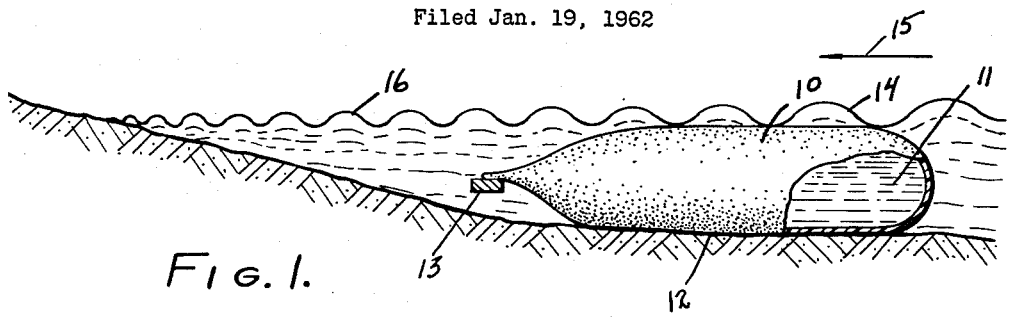
FIGURE 1 illustrates a side elevation, partly in cross-section, of the invention in one mode of operation.

With reference to FIG. 1, the plastic bag 10 is shown filled with sea water 11 and resting on the sea bottom 12. The top surface of the plastic bag is designedly situated so as to extend just under the surface of the water when it is quiescent, or substantially coincidental with the troughs of the waves when there is wave action. The plastic bag 10 is shown attached or moored to a beam 13 which may be suitably supported (supports not shown) toward the shoreward end of the plastic bag. It will be noted that the incident waves 14 which are traveling shoreward, as indicated by the arrow 15, are attenuated in amplitude after passing over the water filled bag. The attenuated waves are indicated at 16.

The plastic bag 10 is constructed of zero buoyancy plastic, meaning plastic of substantially the same density as the water, and may be unmoored, emptied of water, collapsed and stored on a barge or other vessel for transportation to another location.

Upon reaching the point of location, the zero buoyancy plastic bag is filled with water taken from the body of water in which it is to be used and normally allowed to rest on the bottom with its upper surface coincident with the quiet water surface or just underneath it, or substantially coincidental with the troughs of the waves when there is wave action. Where the depth of the water is greater than the depth of the bag, a little air space may be left in the closed bag which will serve to make the bag hover just under the water surface when it is properly moored.

During the development phases of this invention, a series of tests was run with the bags filled with water under pressure. It was found that, by comparison, the pressure filled bags produced inferior results to the ordinarily filled bags. This result was further important in that by using the water at normal hydraulic pressures, any leakage, due to inadvertent holes in the bags, was minimized if not eliminated. It was further found that while the breadth and the height of the bags is not critical, depending solely upon factors of use, the longitudinal length should be at least twice the expected incident wave length for optimum results.

Figure 2:
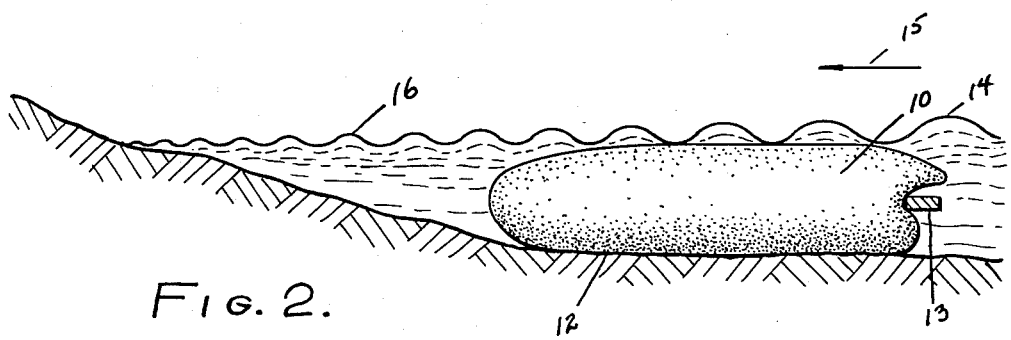
FIG. 2 illustrates a side elevation of the invention in another mode of operation.

The only difference between FIGS. 2 and 1 is found in the location of the mooring beam 13. Here it is shown at the seaward end of the bag 10. Under the circumstances shown during test conditions, the effect of the undertow seems to be greater than that of the surface waves. Actually the form of mooring is not critical. Any suitable mooring arrangement could be provided. For instance, beam 13 could be supported by temporarily driven piling or could be provided with a plurality of small anchors. Where the depth of the water is greater than the depth of the bag, beam 13 could be of wood or other buoyant material or construction which would assist in maintaining the upper surface of the bag(s) coincident or just under the calm surface of the water.

Figure 3:
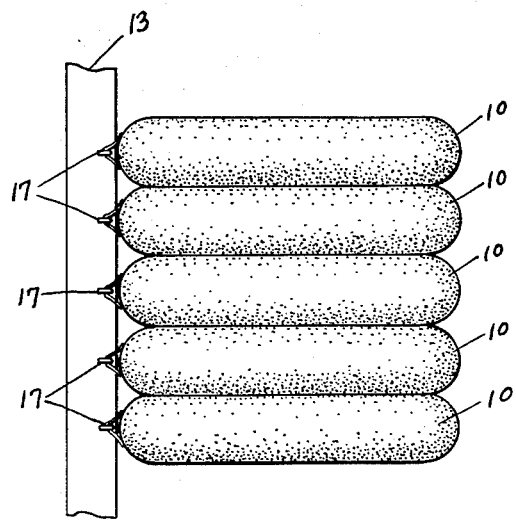
FIG. 3 is a plan view of a number of hovering bag breakwaters installed for multiple operation.

FIG. 3 shows a plurality of bags assembled side by side and secured to the mooring beam 13 by mooring fittings 17. Under normal circumstances of use, a plurality of bags would be used, as shown, depending upon the physical configuration of the area to be protected. It should again be emphasized that the method of mooring chosen is purely incidental and that shown is merely intended to be typical.

While the invention has been described as normally using ambient water for a filler for the plastic bags, it should be understood that the water filler could be replaced with oil or other similar substance having a specific gravity of 1.0 or slightly less than 1.0. This expedient would be valuable where the bags must be used in deeper waters and they have to be given a slight positive buoyancy to offset the added weight and drag of the mooring means utilized therewith. Under other circumstances, where the incident waves, due to some physical configuration, have a considerable amplitude and a short wave length, it might be desirable to add a chemical or other substance to the bag filler material to greatly increase or enhance its viscosity. Tests indicate that such increase in viscosity would more quickly smooth out the high amplitude, high frequency waves so encountered.

Having thus described our invention, we claim:

1. A hovering bag breakwater used in a natural body of water adjacent to a shore thereof for protecting that portion of the body of water between said breakwater and said shore from the impact of high amplitude, low frequency water waves comprising a bag of plastic materials filled with ambient water, said plastic being of substantially the same density as the water, said bag having a longitudinal axis longer than its transverse axes, said bag being moored with its longitudinal axis substantially perpendicular to the wave front of said water waves and with its upper surface substantially coincidental with the troughs of said water waves, the said longitudinal axis of said bag being at least twice the wave length of said water waves.

2. A hovering bag breakwater used in a natural body of water adjacent to a shore thereof for protecting that portion of the body of water between said breakwater and said shore from the impact of high amplitude, low frequency water waves comprising a bag of plastic materials filled with a substance having a specific gravity slightly less than one, said plastic being of substantially the same density as the water, said bag having a longitudinal axis longer than its transverse axes, said bag being moored with its longitudinal axis substantially perpendicular to the wave front of said water waves and with its upper surface substantially coincidental with the troughs of said water waves, the said longitudinal axis of said bag being at least twice the wave length of said water waves.

3. A hovering bag breakwater used in a natural body of water adjacent to a shore thereof for protecting that portion of the body of water between said breakwater and said shore from the impact of high amplitude, low frequency water waves comprising a bag of plastic materials filled with a fluid having a viscosity greater than that of water, said plastic being of substantially the same density as the water, said bag having a longitudinal axis longer than its transverse axes, said bag being moored with its longitudinal axis substantially perpendicular to the wave front of said water waves and with its upper surface substantially coincidental with the troughs of said water waves, the said longitudinal axis of said bag being at least twice the wave length of said water waves.

References Cited by the Examiner
UNITED STATES PATENTS

| | | | |
|---|---|---|---|
| 817,904 | 4/06 | Cook | 61—5 |
| 1,933,597 | 11/33 | McVitty. | |
| 2,185,458 | 1/40 | Giliasso | 61—5 |
| 2,609,666 | 9/52 | Mesnager | 61—30 |
| 3,022,632 | 2/62 | Parks | 61—5 |
| 3,029,606 | 4/63 | Olsen | 61—5 |
| 3,067,712 | 12/62 | Doerpinghaus. | |

FOREIGN PATENTS

| | | |
|---|---|---|
| 145,007 | 7/20 | Great Britain. |
| 33,367 | 10/21 | Norway. |

OTHER REFERENCES

Construction Methods; p. 216, August 1959.
Oil and Gas Journal; pp. 74 and 75, June 6, 1960.
Modern Plastics; pp. 83, September 1961.

EARL J. WITMER, *Primary Examiner.*

WILLIAM I. MUSHAKE, JACOB L. NACKENOFF,
*Examiners.*